L. WILLIS.
SPIKE TOOTH CULTIVATOR.
APPLICATION FILED SEPT. 6, 1912.
1,098,930.
Patented June 2, 1914.
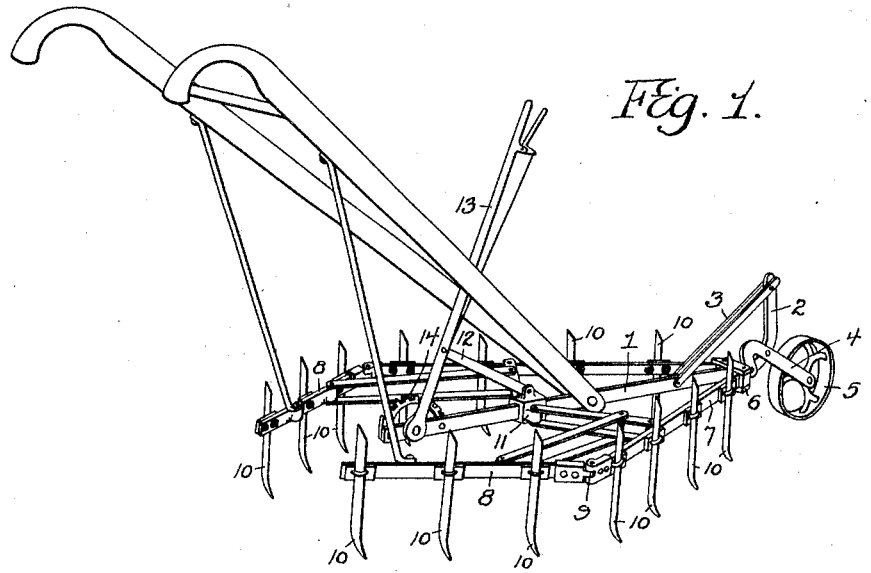
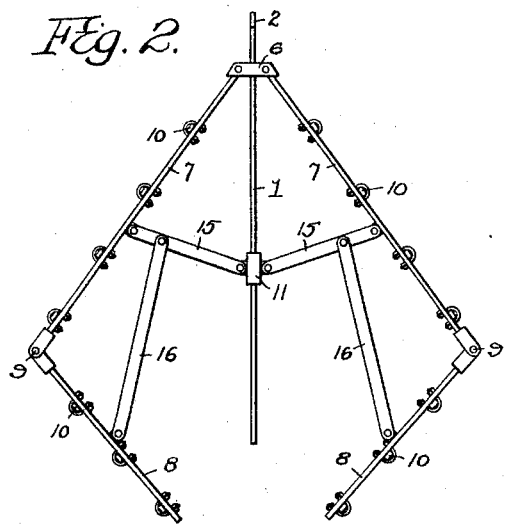
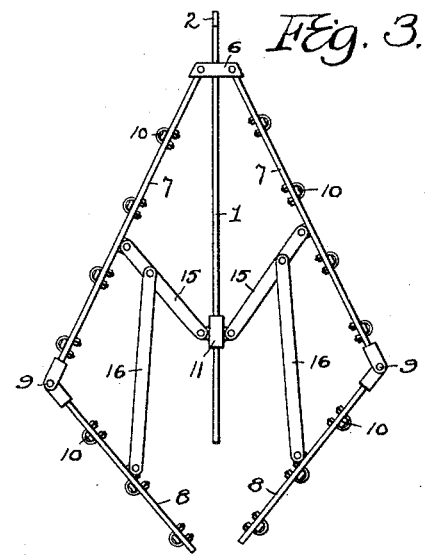
WITNESSES
INVENTOR
LELAND WILLIS
BY HIS ATTORNEY

UNITED STATES PATENT OFFICE.

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

SPIKE-TOOTH CULTIVATOR.

1,098,930.

Specification of Letters Patent. Patented June 2, 1914.

Application filed September 6, 1912. Serial No. 718,848.

*To all whom it may concern:*

Be it known that I, LELAND WILLIS, a citizen of the United States, residing in Grenloch, New Jersey, have invented certain Improvements in Spike-Tooth Cultivators, of which the following is a specification.

My invention relates to that class of agricultural implements known as "spike tooth cultivators" and especially to that type of such implements as have side bars each comprising pivotally connected tooth-carrying front and rear members whose angular relation to each other and to the central bar of the frame can be changed at the will of the operator.

The object of my invention is to provide simple and easily operated mechanism for effecting this change of angular position.

In the accompanying drawing Figure 1 is a perspective view of a spike tooth cultivator constructed in accordance with my invention; Fig. 2 is a plan or top view of the bars of the cultivator frame and of the mechanism for adjusting the side bars, and Fig. 3 is a view similar to Fig. 2, but showing a different angular adjustment of the side bars from that represented in Fig. 2.

Referring in the first instance to Fig. 1 of the drawing, 1 represents the fixed central longitudinal bar of the cultivator frame which is bent upwardly at its forward end, as shown at 2, said upturned forward end of the bar being connected by braces 3 to the bar at a point some distance in the rear of the forward end. To the forward end of the bar 1 is pivoted an arm 4 which carries a roller 5 and said bar 1 is also provided with a cross head 6 to which are pivoted the forward ends of the side bars of the cultivator frame. Each of these side bars comprises a forward member 7 and a rear member 8, these two members being pivotally connected at 9 so that they can assume different angles in relation to one another and to the central bar 1.

Upon each of the members of each side bar of the frame are suitably mounted a series of teeth 10. Mounted so as to move longitudinally on the central bar 1 is a slide 11 which is connected by a link 12 to a lever 13, pivotally mounted near the rear end of the bar 1, this lever being provided with a locking bolt for engagement with a toothed quadrant 14 on the bar 1 so that it can be held in different positions of adjustment in a manner common to many different types of agricultural implements.

Pivotally mounted on opposite sides of the slide 11 are links 15 one of which is pivotally connected at its outer end to the forward member 7 of one of the side bars of the frame, the other link being likewise connected to the forward member 7 of the opposite side bar, the points of connection between the members 7 and the links 15 being at a considerable distance in advance of the pivotal connections 9 between the forward and rear members of the side bars.

Pivotally connected to each link 15 is the forward end of a link 16 whose rear end is pivotally connected to the rear member 8 of the corresponding side bar of the frame. By reason of the link connections described operation of the lever 13 so as to cause forward or backward movement of the slide 11 on the central bar 1 of the frame will cause change in the angular relation of the members 7 and 8 of the side bars to the central bar 1 and also to each other, forward movement of the slide increasing the angle of the side bar members in respect to the central bar and decreasing the angle of the members of each bar in respect to one another, and rearward movement of said slide 11 decreasing the angle of the side bar members in respect to the central bar and increasing the angle of said members in respect to one another, as will be understood in reference to Figs. 2 and 3, the operations being effected by the use of but two pairs of links and a single slide.

I claim:

The combination, in a spike-tooth cultivator, of a central bar and tooth-carrying side bars pivoted at their forward ends and each comprising pivotally connected front and rear members, the latter being free from connection with one another at their rear ends, a longitudinally movable slide on said central bar, links providing a pivotal connection between said slide and the forward members of each of the side bars at a point in advance of the pivotal connection of the latter with the rear members, and other links connecting said first mentioned links to the rear members of the side bars at a point rearwardly beyond the pivotal connections of the latter with the forward members.

In testimony whereof, I have signed my name to this specification, in the presence of two subscribing witnesses.

LELAND WILLIS.

Witnesses:
T. W. McWHORTER,
ERNEST E. UNGER.

Copies of this patent may be obtained for five cents each, by addressing the "Commissioner of Patents, Washington, D. C."